July 17, 1934.  J. M. PESTARINI  1,967,159
ROTARY APPARATUS FOR CONVERTING ALTERNATING ELECTRIC CURRENTS
TO DIRECT ELECTRIC CURRENTS AND VICE VERSA
Filed Aug. 27, 1932
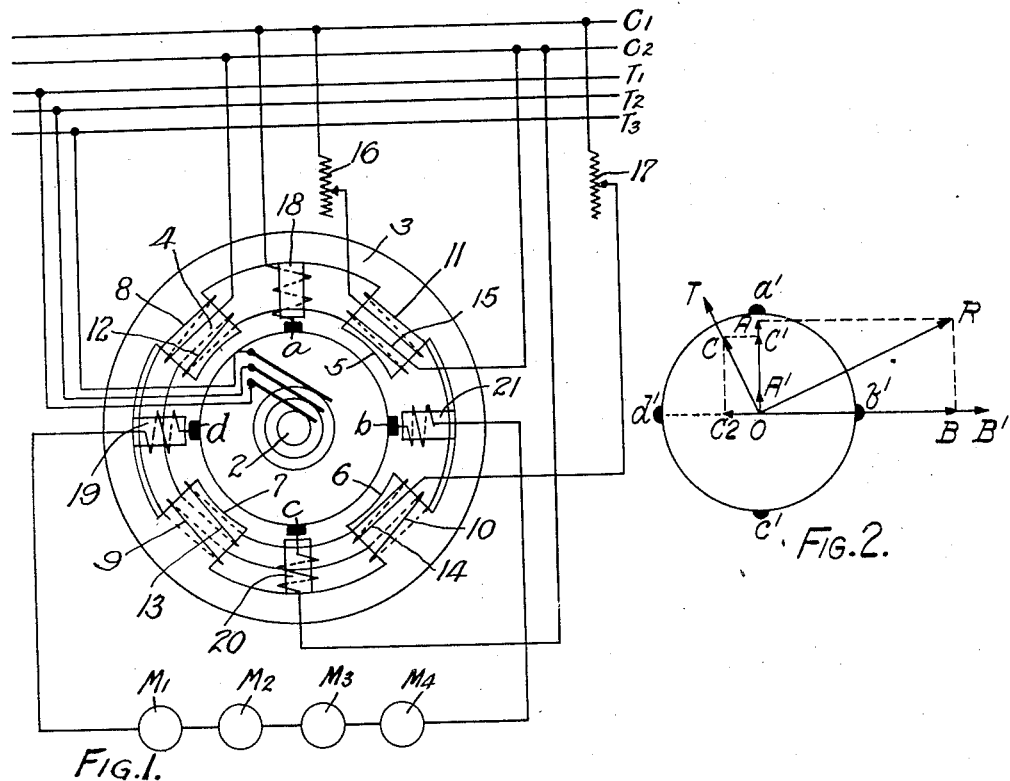
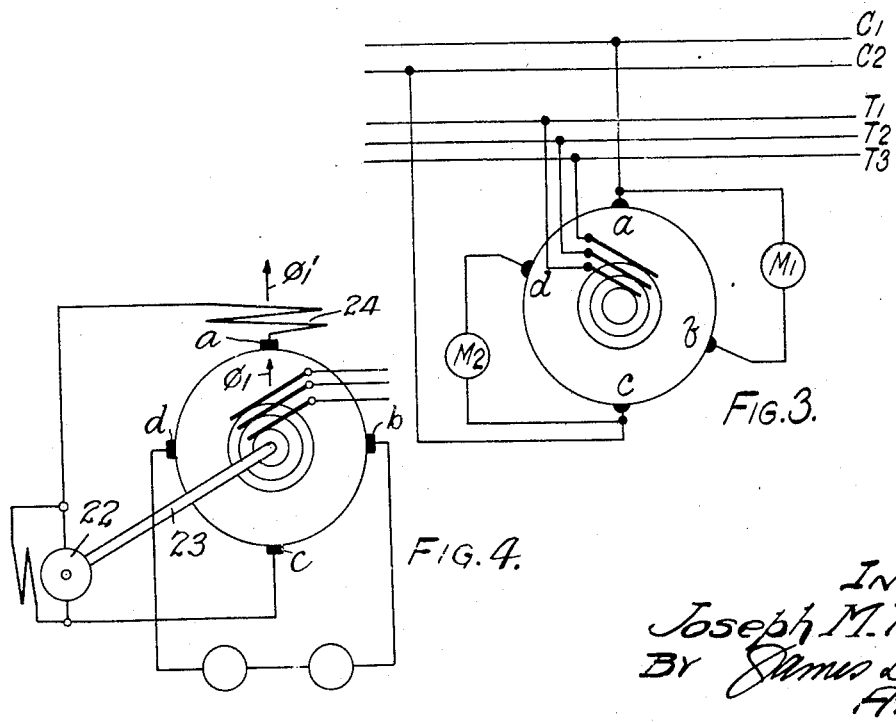
INVENTOR
Joseph M. Pestarini
BY
ATTORNEY Patented July 17, 1934

1,967,159

UNITED STATES PATENT OFFICE 1,967,159

ROTARY APPARATUS FOR CONVERTING ALTERNATING ELECTRIC CURRENTS TO DIRECT ELECTRIC CURRENTS AND VICE VERSA

Joseph Maxime Pestarini, Paris, France

Application August 27, 1932, Serial No. 630,716
In France September 12, 1931

16 Claims. (Cl. 171—123)

This invention relates to rotary apparatus for converting alternating electric currents to direct electric currents and vice versa, and has for one of its objects to construct a machine for converting alternating current power at constant voltage to direct current power at variable voltage, the direct current following a predetermined law, for example being maintained constant.

According to the invention the improved machine comprises a rotary armature with an ordinary winding somewhat similar to that of an ordinary direct current dynamo electric machine. The armature is provided with a commutator and slip rings by which it may be supplied with energy from an alternating current circuit. Two pairs of brush sets are arranged to make contact with the commutator, one pair, called the primary brush sets, are connected to a constant voltage direct current supply, the other pair, called the secondary brush sets, are connected to the circuit to which direct current is to be supplied, the voltage and current in which are to be varied in accordance with a predetermined law.

The armature is surrounded by a stator which is divided into as many polar segments as there are zones of commutation so that each commutation zone is located in the space between two adjacent polar segments. Commutating poles may be provided between the main polar segments if desired. The polar segments of the stator can be severally provided with one or more coils or some of the segments may be provided with coils, the others being entirely free from current-carrying windings. The slip rings are adapted to be connected through brushes to a source of alternating current supply which may be single phase or polyphase and which it is desired to convert into direct current in a circuit whereof the voltage and current vary in accordance with a predetermined law. The improved machine according to the present invention is conveniently called, and will be hereinafter referred to as, an amphidyne.

In order that the nature of the invention may be more clearly understood it will now be described with reference to the accompanying drawing in which:—

Fig. 1 is a diagram of an amphidyne according to the invention.

Fig. 2 is a vector diagram explanatory of the various magnetic fluxes and currents flowing in the armature.

Figures 3 and 4 are electrical diagrams somewhat similar to Fig. 1 illustrating different circuit arrangements.

In considering a rotary electrical machine of the nature herein referred to it is customary to refer to its construction as comprising a certain number of cycles. If an observer moves along making a complete tour of the circumference of the rotor of such an electrical machine, when this is stationary, he will see the same electrical elements and the same magnetic elements repeated a number of times. If, for example, he sees them repeated $p$ times the machine is said to comprise $p$ cycles. For instance, a six-pole dynamo electric machine has three cycles and a two-pole dynamo electric machine has only one cycle.

In the following description one-cycle machines will be referred to, but it will be understood that with suitable alterations which are obvious to electrical engineers skilled in the art, the invention can be applied to machines of more than one cycle.

Referring now to Fig. 1, the commutator of the amphidyne is indicated by the circle 1, the primary brush sets at $a$, $c$, and the secondary brush sets at $b$, $d$, and slip rings shown, for example, as three in number, at 2. The primary brushes are connected to a source of direct current supply $C_1$, $C_2$, the secondary brushes are cross-connected through a load circuit including a number of motors indicated at $M_1$, $M_2$, $M_3$, $M_4$, and the slip rings are connected to a polyphase circuit indicated at $T_1$, $T_2$, $T_3$. The stator of the machine is indicated at 3 and is provided with four polar segments 4, 5, 6, 7 which in the example shown are each provided with two windings marked 8 to 11 and 12 to 15 respectively. The windings 8 to 11 are connected in series and supplied with current from the direct current source $C_1$, $C_2$ through a variable resistance 16. The windings 12 to 15 are also connected in series and supplied with current from the source $C_1$, $C_2$ through the variable resistance 17. Commutating poles are shown at 18 to 21 provided with windings in series with the brush sets with which said poles are associated in the usual manner so as to obtain good commutation. The direction of current in the windings 8 to 11 is such that the polarities of the segments 4 and 5 will be the same, and those of the segments 6 and 7 will be the same but opposite in sign to those of the segments 4 and 5, so that the general direction of the resultant magnetic flux in the armature due to said windings will be in line with the brushes $a$, $c$. The direction of current in the windings 12 to 15 is such that the polarities of the segments 4 and 7 will be the same and those of the segments 5 and 6 will be the same but opposite in sign to those of the segments 4 and 7 so that the general direction of the resultant magnetic fluxes through the armature due to the current flowing in these windings will be line with the brushes, $b$, $d$. It will be understood that some of the stator windings, for example 9 and 10 and 14 and 15, may be omitted, but that such windings must be provided and supplied with current as will give rise to resultant magnetic flux in the armature in the lines, $a$, $c$, $b$, $d$ as above described.

In considering the operation of the machine the armature is assumed to be rotated at a constant speed in synchronism with the polyphase currents supplied from the circuit $T_1$, $T_2$, $T_3$. The speed will generally be maintained constant owing to the action of the field created by the currents from the primary brushes and to the fields created by the stator coils when such coils are present.

If in the first place only the action of the direct currents is considered, the slip rings being disconnected from the alternating current circuit, the primary brushes $a$, $c$ will usually be arranged in such a manner that the ampere turns of the primary current will produce a magnetic flux in a direction to induce in the armature windings an electromotive force between the secondary brushes $b$, $d$. The current flowing in the secondary circuit, together with the action due to the windings on the stator, will create a magnetic flux which induces in the armature windings a counter electromotive force between the commutator segments with which the primary brushes make contact. If the voltage of the circuit $C_1$, $C_2$ is constant the counter electromotive force and the magnetic flux last referred to must also be constant, and it thus follows that the combined ampere turns of the secondary current flowing in the armature and the stator windings, when such are provided, must likewise be constant. From this it is clear that the value of the secondary current will be a function of the current in the stator windings.

The armature ampere turns due to the alternating current when supplied from the circuit $T_1$, $T_2$, $T_3$ to the slip rings are superimposed on those of the direct current and are given such a direction, or sense, that the torque resulting from the electrical reactions of the machine is neutralized and only the torque necessary for overcoming mechanical losses will be unbalanced.

The positions of the direct current brushes may be varied in accordance with the particular application which it is desired to make of the machine.

If the performance of the machine before being connected to the alternating current supply but after being connected to the direct current circuits, that is to the supply mains $C_1$, $C_2$ and to the consumption circuit containing the motors $M_1$, $M_2$, $M_3$, $M_4$, is considered, the ampere turns of the armature windings with reference to the axis $bd$ must remain constant as previously explained if the voltage supply to the primary circuit is constant. Consequently the secondary current remains constant if the ampere turns of the windings on the stator poles which generate a magnetic flux in the direction $bd$ are unchanged. If the windings on the stator are varied, or if the current through them is varied, then the secondary current will vary until the resulting ampere turns of the armature and stator windings in the direction $bd$ have returned to their original value. Consequently by a suitable variation of the ampere turns of the stator windings 12, 13, 14 and 15 (Fig. 1) which give a resultant magnetic flux in the axis $bd$, the secondary current may be adjusted at will. The stator windings which are used for this purpose are conveniently termed the "variator" windings.

If the stator is provided with windings such as those indicated at 8, 9, 10 and 11 in Fig. 1 arranged with their magnetic axis, the same as that of the ampere turns of the rotor winding which are due to primary current and inducing a resultant magnetic flux in the same direction as the primary current in the rotor, then the main portion of the energy will no more be supplied by the constant voltage direct current, but either by the shaft by some mechanical prime drive in case that no connections are made to the alternating current network, or by the alternating current source if connections are secured between it and the rotor. The final aim is to supply the energy from the alternating current network, so no mechanical primer mover will finally be necessary, but in order to show the action of the alternating current it will be supposed that the mechanical torque on the shaft is gradually eliminated.

Referring now to the vector diagram Fig. 2, the points $a'$, $b'$, $c'$, $d'$ correspond to the brush positions $a$, $b$, $c$, $d$ in Fig. 1. If alternating current from the mains $T_1$, $T_2$, $T_3$ in Fig. 1 is supplied to the slip rings 2, and assuming that the flux in the primary brush axis $ca$ is OA, the flux in the secondary axis $bd$ is OB, the resultant of the two fluxes being OR and that the torque on the shaft is still that corresponding to a balance between the D. C. circuits, that is the primary and secondary circuits, then the alternating current voltage OT, Fig. 2, will be 90° in advance of the resultant flux OR, and the resulting alternating current ampere turns will be zero.

With a suitable choice of scales, and assuming that the iron portions of the circuits are far from magnetic saturation, the vectors of the diagram Fig. 2 may represent either the magnetic fluxes or the corresponding ampere turns. Assuming, next, that by a suitable device the torque on the amphidyne shaft due to the primary current in the rotor windings is gradually eliminated then the alternating current ampere turns will gradually increase. Supposing that these ampere turns are compensated then the compensating ampere turns will be represented by OC in the direction OT. The equilibrium will not be disturbed, because the alternating current ampere turns will create a torque equal to that which had been eliminated from the amphidyne shaft due to the primary direct current. The alternating current ampere turns will correspond to power absorbed from the alternating current supply with a power factor equal to unity and no wattless power. In order to compensate the ampere turns OC the ampere turns in the primary direction are reduced to OA' where AA' equals $OC_1$, and the ampere turns in the secondary direction are increased from OB to OB' where BB' equals $OC_2$.

These modifications can be made either by the action of stator windings, as shown at 8 to 15 in Fig. 1, located on the polar segments, so as to give rise to magnetic fluxes in the different axes ($a'$ $c'$, $b'$ $d'$) under consideration, as hereinbefore described, or by variation of the primary or secondary currents, or in some cases by a variation of the primary current voltage. Whichever method be adopted the secondary current can always be controlled and adjusted by means of the variator winding on the stator as hereinbefore described.

If the ampere turns represented by the vector OC in Fig. 2 are not completely compensated then the alternating current ampere turns will generally have a direction which does not coincide with the vector OT in Fig. 2 and the alternating current line will therefore supply wattless power and the power factor will be less than unity. The secondary current will in general also undergo a modification, but by means of the variator winding it can always be readjusted at will.

The modification of the various currents in the stator windings can be made continuously by means of variable resistance, as indicated at 16 and 17 in Fig. 1, and by this means a characteristic curve connecting the secondary current with the primary voltage of any desired shape can be obtained.

Fig. 3 is a diagram similar to Fig. 1 showing a machine in which the primary brushes $a$, $c$ and the secondary brushes $b$, $d$ are not equally spaced around the commutator. Two load circuits connected to the brushes $a$, $b$ and $c$, $d$ respectively are provided in each of which a motor $M_1$ and $M_2$ respectively may be inserted. This method of connecting the load circuits is commonly known as the figure 8 connection.

The constant voltage direct current supply, which in Figs. 1 and 3 is shown as being obtained from direct current mains $C_1$ and $C_2$ may be obtained from a dynamo driven mechanically from the amphidyne shaft. Referring to Fig. 4, a shunt excited dynamo 22 is mounted on the shaft 23 of the metadyne armature and supplies current to the pair of primary brush sets $a$, $c$. In order to reduce the power supplied by this dynamo, windings, as indicated at 24, may be provided on the stator of the amphidyne the ampere turns of which will give rise to a magnetic flux in the same direction as the ampere turns due to the primary current in the rotor. It will be understood that the winding 24 is equivalent to the windings 8, 9, 10, 11 in Fig. 1, but is shown for simplicity as a single coil co-axial with the line of the brushes $a$, $c$. The stator of the machine is omitted from this figure for the sake of clearness.

The machine may be arranged for use with single phase or with alternating current of more phases by modifications which will be evident to those skilled in the art. Machines according to the invention may also be used to convert direct currents into alternating currents of one or more phases if desired.

I claim:—

1. A dynamo electric machine for converting alternating currents into constant direct current and vice-versa comprising a rotary armature having windings connected to a commutator and slip rings, brushes for conveying alternating current to the slip rings, and two pairs of brush sets associated with the commutator, a first pair on which a direct current at constant voltage is impressed, and a second pair of brush sets associated with the commutator supplying substantially constant direct current, a stator having a high degree of permeance, the permeance of the stator being high so that the rotor ampere-turns due to the current traversing the second pair of brush sets creates a flux sufficient to balance that due to the total constant direct current voltage impressed upon the first pair of brush sets.

2. A machine as defined in claim 1, in which there is provided a series field winding on the stator traversed by the current of the first pair of brush sets, and creating ampere turns in the same direction and in the same sense as the rotor ampere turns due to the current traversing the first pair of brush sets.

3. A machine as defined in claim 1, in which a shunt field winding is provided on the stator creating ampere turns in the same direction and in the same sense as the rotor ampere turns due to the current traversing the first pair of brush sets.

4. A machine as defined in claim 1, provided with a series field winding traversed by the current of the first pair of brush sets and with a shunt field winding, said series and shunt windings traversed by current creating ampere turns in the same direction and in the same sense as the rotor ampere turns due to the first pair of brush sets.

5. A dynamo electric machine for converting alternating currents into constant direct current and vice-versa comprising a rotary armature having windings connected to a commutator and slip rings, brushes for conveying alternating current to the slip rings, and two pairs of brush sets associated with the commutator, a first pair on which a direct current at constant voltage is impressed, and a second pair of brush sets associated with the commutator supplying substantially constant direct current, a stator having a high degree of permeance, the permeance of the stator being high so that the rotor ampere turns due to the current traversing the second pair of brush sets creates a flux sufficient to balance that due to the total constant direct current voltage impressed upon the first pair of brush sets, said stator provided with a series field winding traversed by current of the first pair of brush sets, and a shunt field winding, both of said windings creating ampere turns in the same direction and in the same sense as the rotor ampere turns due to the first pair of brush sets, said stator also provided with a second shunt field winding creating ampere turns in the same direction as the rotor ampere turns due to the current traversing the second pair of brush sets, and tending to de-excite the magnetic circuit.

6. A machine as defined in claim 5 in which the constant current consumption circuit is connected between the two brush sets of the second pair.

7. A machine as defined in claim 1 in which a constant current consumer circuit is connected between one brush set of the first pair and one brush set of the second pair, and other consumer circuits connected between the other brush set of the first pair and the other brush set of the second pair.

8. A machine as defined in claim 1 in which there is provided a series field winding on the stator traversed by the current of the first pair of brush sets, and creating ampere turns in the same direction and in the same sense as the rotor ampere turns due to the current traversing the first pair of brush sets, a constant current consumer circuit is connected between one brush set of the first pair and one brush set of the second pair, and other consumer circuits connected between the other brush set of the first pair and the other brush set of the second pair.

9. A machine as defined in claim 1 in which a shunt field winding is provided on the stator creating ampere turns in the same direction and in the same sense as the rotor ampere turns due to the current traversing the first pair of brush sets, and a constant current consumer circuit is connected between one brush set of the first pair and one brush set of the second pair, and other consumer circuits connected between the other brush set of the first pair and the other brush set of the second pair.

10. A machine as defined in claim 1 in which the machine is provided with a series field winding traversed by the current of the first pair of brush sets and with a shunt field winding, said series and shunt windings traversed by current creating ampere turns in the same direction and in the same sense as the rotor ampere turns due to the first pair of brush sets, and a constant current consumer circuit is connected between one brush set of the first pair and one brush set of the second pair, and other consumer circuits connected between the other brush set of the first pair and the other brush set of the second pair.

11. A machine as defined in claim 5 in which a constant current consumer circuit is connected between one brush set of the first pair and one brush set of the second pair, and other consumer circuits connected between the other brush set of the first pair and the other brush set of the second pair.

12. A machine as defined in claim 1 in which a direct current dynamo mechanically connected to the armature shaft of the main machine and driven thereby supplies constant voltage direct current to the first pair of brush sets, and in which a constant current consumer circuit is connected between one brush set of the first pair and one brush set of the second pair, and other consumer circuits connected between the other brush set of the first pair and the other brush set of the second pair.

13. A machine as defined in claim 1 in which there is provided a direct current dynamo mechanically connected to the armature shaft of the main machine and driven thereby and supplying the constant voltage direct current to the first pair of brush sets, a series field winding on the stator traversed by the current of the first pair of brush sets, and creating ampere turns in the same direction and in the same sense as the rotor ampere turns due to the current traversing the first pair of brush sets, a constant current consumer circuit is connected between one brush set of the first pair and one brush set of the second pair, and other consumer circuits connected between the other brush set of the first pair and the other brush set of the second pair.

14. A machine as defined in claim 1 in which a direct current dynamo mechanically connected to the armature shaft of the main machine and driven thereby supplies constant voltage direct current to the first pair of brush sets, and in which a shunt field winding is provided on the stator creating ampere turns in the same direction and in the same sense as the rotor ampere turns due to the current traversing the first pair of brush sets, and a constant current consumer circuit is connected between one brush set of the first pair and one brush set of the second pair, and other consumer circuits connected between the other brush set of the first pair and the other brush set of the second pair.

15. A machine as defined in claim 1 in which a direct current dynamo mechanically connected to the armature shaft of the main machine and driven thereby supplies constant voltage direct current to the first pair of brush sets, and in which the machine is provided with a series field winding traversed by the current of the first pair of brush sets and with a shunt field winding, said series and shunt windings traversed by current creating ampere turns in the same direction and in the same sense as the rotor ampere turns due to the first pair of brush sets, and a constant current consumer circuit is connected between one brush set of the first pair and one brush set of the second pair, and other consumer circuits connected between the other brush set of the first pair and the other brush set of the second pair.

16. A machine as defined in claim 5 in which a direct current dynamo mechanically connected to the armature shaft of the main machine and driven thereby supplies constant voltage direct current to the first pair of brush sets, and in which a constant current consumer circuit is connected between one brush set of the first pair and one brush set of the second pair, and other consumer circuits connected between the other brush set of the first pair and the other brush set of the second pair.

JOSEPH MAXIME PESTARINI.